(12) United States Patent
Daudi

(10) Patent No.: US 6,241,061 B1
(45) Date of Patent: Jun. 5, 2001

(54) REDUCED NOISE BRAKE SHOE ASSEMBLY

(75) Inventor: Anwar R. Daudi, Ann Arbor, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/052,531

(22) Filed: Mar. 31, 1998

Related U.S. Application Data

(60) Provisional application No. 60/047,672, filed on May 27, 1997.

(51) Int. Cl.$^7$ .................................................... F16D 51/00
(52) U.S. Cl. ............................................ 188/340; 188/328
(58) Field of Search ............................... 188/78, 325–340

(56) References Cited

U.S. PATENT DOCUMENTS

| | | |
|---|---|---|
| 2,263,949 | 11/1941 | Harle . |
| 2,999,566 * | 9/1961 | Naudzius ............................. 188/340 |
| 3,108,659 * | 10/1963 | Swift ................................... 188/340 |
| 3,126,984 * | 3/1964 | Birge .................................. 188/340 |
| 3,232,388 | 2/1966 | Gancel . |
| 3,782,513 * | 1/1974 | Birge .................................. 188/340 |
| 4,151,901 | 5/1979 | Parfitt . |
| 4,623,050 | 11/1986 | Copp . |
| 4,790,704 | 12/1988 | Temple et al. . |
| 4,987,979 * | 1/1991 | Wicks ............................. 188/250 E |
| 5,201,390 | 4/1993 | Anderson et al. . |
| 5,238,089 | 8/1993 | Matsuzaki et al. . |
| 5,262,599 | 11/1993 | Aguirre, Sr. . |
| 5,322,145 | 6/1994 | Evans . |
| 5,383,539 | 1/1995 | Bair et al. . |
| 5,390,769 | 2/1995 | Bair et al. . |
| 5,540,310 | 7/1996 | Lüdtke et al. . |

FOREIGN PATENT DOCUMENTS

2039644 * 8/1980 (GB) ..................................... 188/340

* cited by examiner

*Primary Examiner*—Christopher P. Schwartz
(74) *Attorney, Agent, or Firm*—Marshall & Melhorn, LLC

(57) ABSTRACT

The present invention is a drum brake shoe assembly having an improved support structure which limits the lateral travel of the leading brake shoe, to thereby reduce or eliminate audible impacts between the brake shoe and the backing plate of the drum brake assembly. In accordance with the invention, two or more spaced apart hold down devices are provided on the leading brake shoe while a single hold down device is used on the trailing brake shoe. Each of the hold down device includes a hold down pin connected at a first end to the backing plate of the drum brake assembly. The second end of each hold down pin extends through an opening in the web of the brake shoe. Springs such as coil springs or the like are disposed between the second ends of the hold down pins and the brake shoe web for urging the brake shoe against the backing plate.

2 Claims, 1 Drawing Sheet

REDUCED NOISE BRAKE SHOE ASSEMBLY

RELATED APPLICATION

This application is claiming the benefit, under 35 USC §119(e), of the provisional application filed May 27, 1997 under 35 USC § 111(b), which was granted a Ser. No. 60/047,672. The provisional application, Ser. No. 60/047,672, is hereby incorporated by reference in its entirety.

BACKGROUND OF THE INVENTION

The present invention relates generally to a drum brake shoe assembly and, in particular, to a drum brake shoe assembly having an improved brake shoe support structure to retain the drum brake shoe in position relative to a backing plate.

Conventional drum brakes include a pair of drum brake shoes each having a semicircular rim with a radially outer surface and a band of friction material attached thereto. A strengthening web is attached to the rim and extends radially inwardly along most of the length of each shoe. The brake shoes are mounted on a backing plate of the drum brake assembly and supported in place by a hold down mechanism. A conventional hold down mechanism consists of a hold down pin having a first end connected to the backing plate and a second end extending through a hole in the brake shoe web. A coil spring is typically disposed between the second end and the web to urge the brake shoe toward the backing plate. While most drum brake assemblies use one hold down mechanism per shoe, it is known to use two hold down mechanisms for each brake shoe, as disclosed in U.S. Pat. No. 5,201,390 to Anderson et al. However, using two hold down mechanisms per brake shoe is generally undesirable due to the increased cost and complexity.

To brake the vehicle, the brake shoes are moved radially outwards by an actuator, such as a hydraulically or pneumatically actuated brake cylinder, until the friction material contacts a corresponding friction surface on the brake drum. The friction created during contact slows the rotation of the drum and wheel, thus slowing the vehicle.

However, the applicant has discovered that the conventional brake shoe support configuration using only one hold down mechanism per shoe allows considerable unwanted shoe movement in the lateral direction (also known as the axial direction in relation to the brake drum or wheel) during braking in response to variations in the surface of the brake drum. The applicant has further discovered that the movement of the shoe in the lateral direction allows the shoe to impact with the backing plate causing unacceptable noise during braking. It is desirable to reduce the braking noise by reducing the unwanted shoe movement during braking while keeping the added cost and complexity to a minimum.

SUMMARY OF THE INVENTION

The present invention is a drum brake shoe assembly having an improved support structure which limits the lateral travel of the leading brake shoe, to thereby reduce or eliminate audible impacts between the brake shoe and the backing plate of the drum brake assembly. In accordance with the invention, two or more spaced apart hold down devices are provided on the leading brake shoe while a single hold down device is used on the trailing brake shoe. Each hold down device includes a hold down pin connected at a first end to the backing plate of the drum brake assembly. The second end of each hold down pin extends through an opening in the web of the brake shoe. Springs such as coil springs or the like are disposed between the second ends of the hold down pins and the brake shoe web for urging the brake shoe against the backing plate.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

The present invention relates to a drum brake assembly which is conventional and well known to those skilled in the art which includes an improved brake shoe support structure. It is to be understood that the specific device illustrated in the attached drawings and described in the following specification is simply an exemplary embodiment of the invention defined in the appended claims. Hence, specific dimensions and other physical characteristics relating to the embodiments disclosed herein are not to be considered as limiting, unless the claims expressly state otherwise.

Figure 1:
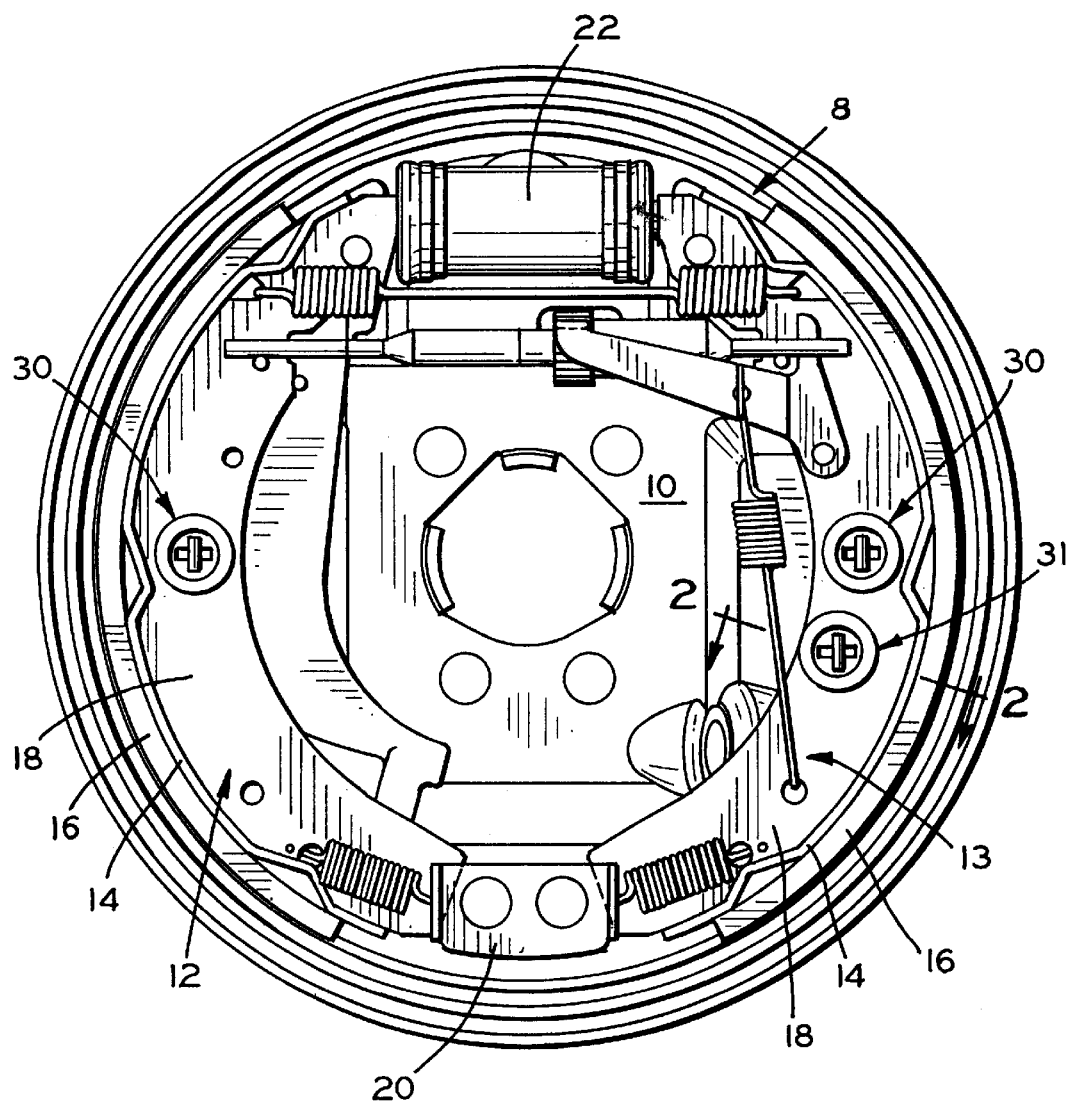
FIG. 1 is an axial view of a drum brake assembly comprising a brake shoe support structure in accordance with the invention.

Referring now to the drawings, there is illustrated in FIG. 1 a drum brake assembly 8 including a backing plate 10 which is fastened to the axle of a motor vehicle (not shown). A pair of brake shoes, including a trailing brake shoe 12 and a leading brake shoe 13, are fastened to the backing plate 10, as described below. Each of the brake shoes 12 and 13 comprises a rim 14 bent in circular arc shape to support a friction lining 16 which has been secured to the rim 14. A brake shoe web 18 is secured to the rim 14 and is arranged so as to be in a parallel orientation to the backing plate 10. As is well known, a thrust bearing 20 is secured to the backing plate 10 between the two brake shoes 12 and 13, and a wheel brake cylinder 22 is disposed diametrically opposite the thrust bearing 20. The drum brake assembly 8 is preferably a hydraulic braking system having a hydraulically actuated wheel brake cylinder 22, alternatively, the drum brake assembly may be pneumatically actuated.

Each of the two brake shoes 12 and 13 is held in engagement with the backing plate 10 by a centrally located primary hold down device 30. In addition, in accordance with the present invention, the leading shoe 13 is further provided with at least one additional, secondary hold down device 31 which is spaced apart from the primary hold down device 30. Each of the hold down devices 30 and 31 employed in accordance with the invention may be of identical structure, and therefore only the hold down device 31 will be shown and described in greater detail.

Figure 2:
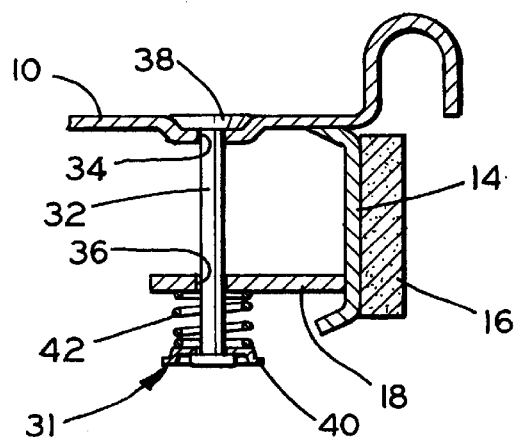
FIG. 2 is a sectional view taken along the line 2—2 in FIG. 1.

As best illustrated in FIG. 2, the hold down device 31 includes a hold down pin 32 which passes through a hole 34 provided in the backing plate 10 and through a hole 36 in the web 18 of the leading brake show 13. One end of the hold down pin 32 is provided with a head 38 which is adapted to abut the adjacent surface of the backing plate 10. The opposite end of the hold down pin 32 is provided with a second head 40 which, when the first head 38 is in abutment with the backing plate 10, is spaced apart from the web 18 of the brake shoe 13.

The hold down device 31 further includes a spring assembly 42 extending between the second head 40 of the hold down pin 32 and the web 18 of the brake shoe 13. In cooperation with the hold down pin 32, the spring assembly 42 urges the brake shoe 13 towards the backing plate 10 to retain the brake shoe against the backing plate thereby inhibiting lateral movement of the shoe. The spring assembly 42 may be comprised of any suitable spring or spring-like device, such as a leaf spring or the helical spring illustrated in the drawings.

During braking, the vehicle operator depresses the brake pedal (not shown) which hydraulically actuates the wheel cylinder 22. The brake shoes 12 and 13 are displaced in the radially outward direction by the wheel brake cylinder 22 pivoting against the thrust bearing 20. The friction linings 16 are applied against the friction surface of the brake drum (not shown) in the conventional manner to brake the vehicle. As per industry convention, the friction lining of the leading brake shoe 13 contacts the friction surface of the brake drum before the trailing brake shoe friction lining, hence the derivation of the terms leading and trailing brake shoes.

As described above, the prior art drum brake assembly preferably uses a single hold down device for each brake shoe to retain the shoes against the backing plate. Using a single hold down device per shoe has typically been preferred over other known assemblies using two hold down devices for each shoe because of the greater simplicity and lower costs of using fewer hold down devices. However, it was found that while the conventional single hold down device 30 does adequately prevent lateral movement of the trailing brake shoe 12, the leading shoe 13 is not adequately retained against the backing plate 10. With a single hold down device 30, the leading shoe 13 was found to have an undesirable amount of lateral movement during braking. As a result, the leading shoe 13 was free to periodically impact against the backing plate 10, causing an unacceptable level of noise from the drum brake assembly 8.

The movement of the leading brake shoe 13 during operation is complex, but has been found to occur primarily in lateral planes in response to variations in the surface of the brake drum as installed in a motor vehicle. Outboard tight spots between the friction lining 16 and the drum friction surface cause the brake shoe 12 to move laterally away from the backing plate 10, while inboard tight spots cause the brake shoe to move laterally towards the backing plate. The result is an often audible impact between the leading brake shoe 13 and the backing plate 10 for each rotation of the associated motor vehicle wheel.

Accordingly, it was found that using two, spaced apart hold down devices 30, 31 on the leading shoe 13, the lateral travel of the shoe 12 is greatly restricted as compared with the single point shoe support structure conventionally employed. The present invention thus reduces or even eliminates the occurrence of audible impact between the brake shoe and the backing plate of the drum brake assembly during the operation of the associated motor vehicle.

As noted above, while two spaced apart hold devices on the leading shoe are sufficient to provide significantly improved noise reduction of the drum brake assembly, more than two such hold down devices may be employed to further restrict lateral movement of the leading brake shoe relative to the backing plate. In addition, in a preferred embodiment, the two or more hold devices are spaced as far apart as is practicable to maximize the restriction in the lateral movement of the brake shoe.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A drum brake assembly comprising:
   a) a backing plate;
   b) a pair of brake shoes mounted on said backing plate, said pair of brake shoes including a leading brake shoe and a trailing brake shoe, wherein said leading brake shoe has a greater tendency for lateral movement towards or away from said backing plate than said trailing brake shoe during braking;
   c) only a single hold down device extending through said trailing brake shoe at a single location for retaining said trailing brake shoe against said backing plate; and
   d) at least two spaced apart hold down devices extending through said leading brake shoe for retaining said leading brake shoe against said backing plate and inhibiting said greater tendency for lateral movement of said leading brake shoe.

2. The invention defined in claim 1 wherein said hold down devices include spring assemblies for urging said leading and trailing brake shoes into engagement with said backing plate.

\* \* \* \* \*